Oct. 3, 1939.   W. L. ALLISON   2,174,956
DUMPING TRUCK
Filed Jan. 13, 1938   3 Sheets-Sheet 1
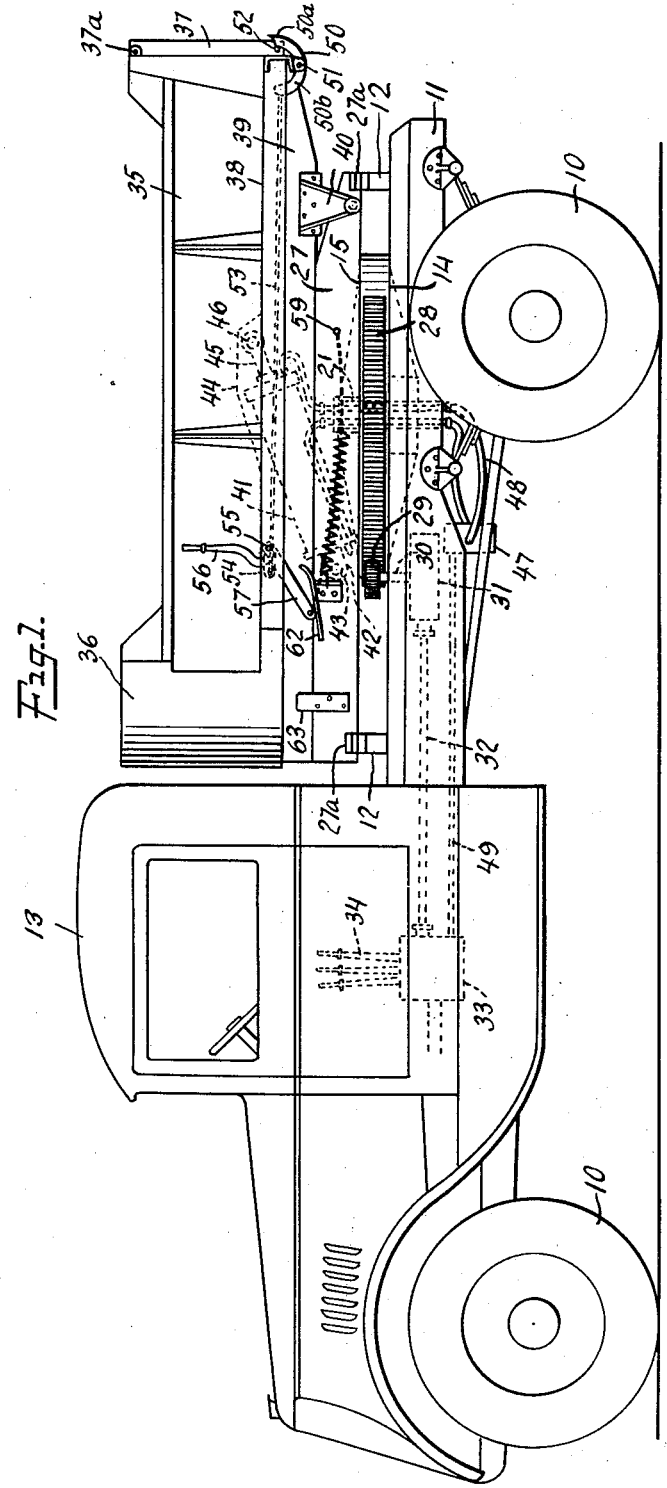
INVENTOR
William L. Allison
BY
ATTORNEYS Oct. 3, 1939.　　　　W. L. ALLISON　　　　2,174,956
DUMPING TRUCK
Filed Jan. 13, 1938　　　　3 Sheets-Sheet 2
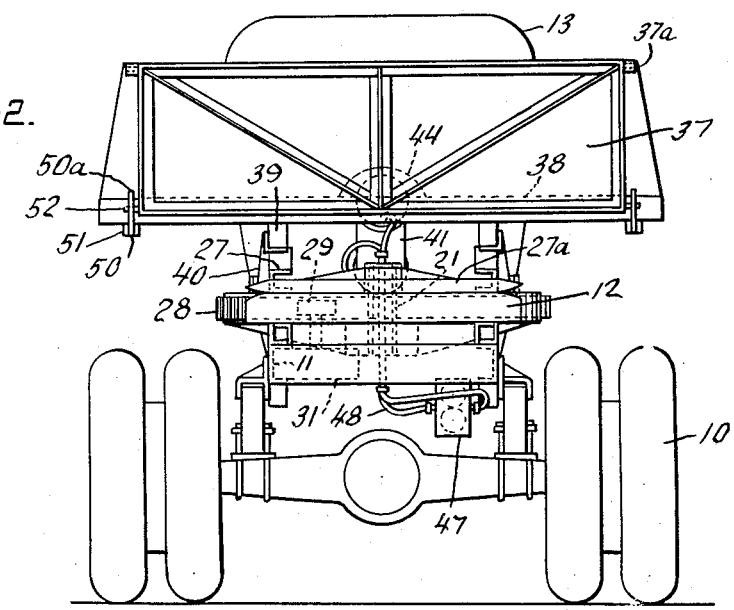
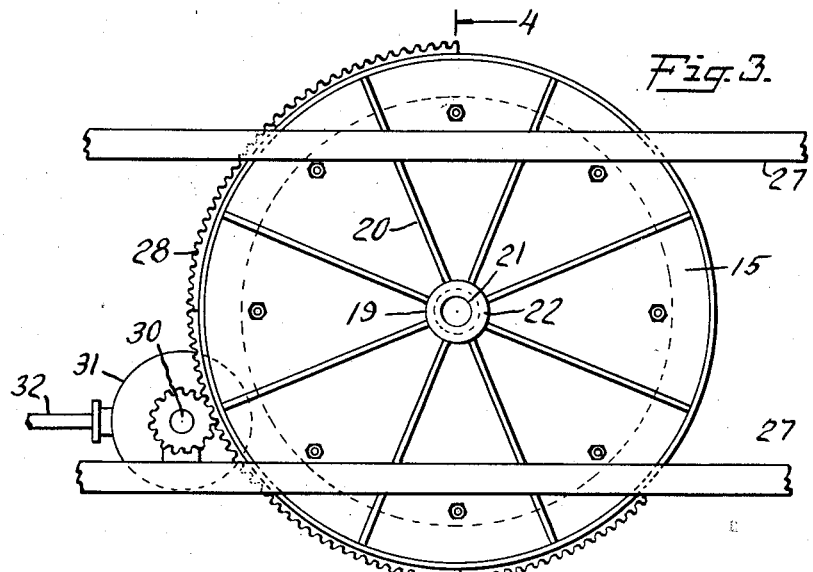
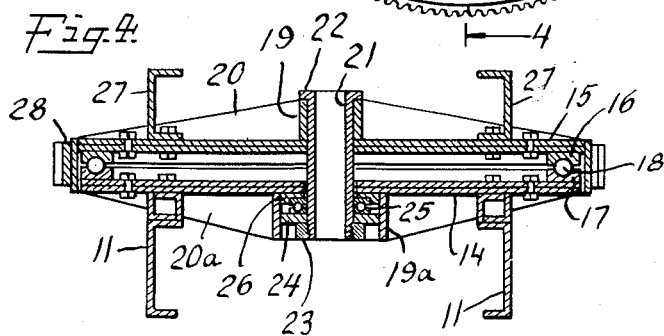
INVENTOR
William L. Allison
BY
ATTORNEYS Oct. 3, 1939.   W. L. ALLISON   2,174,956
DUMPING TRUCK
Filed Jan. 13, 1938   3 Sheets-Sheet 3
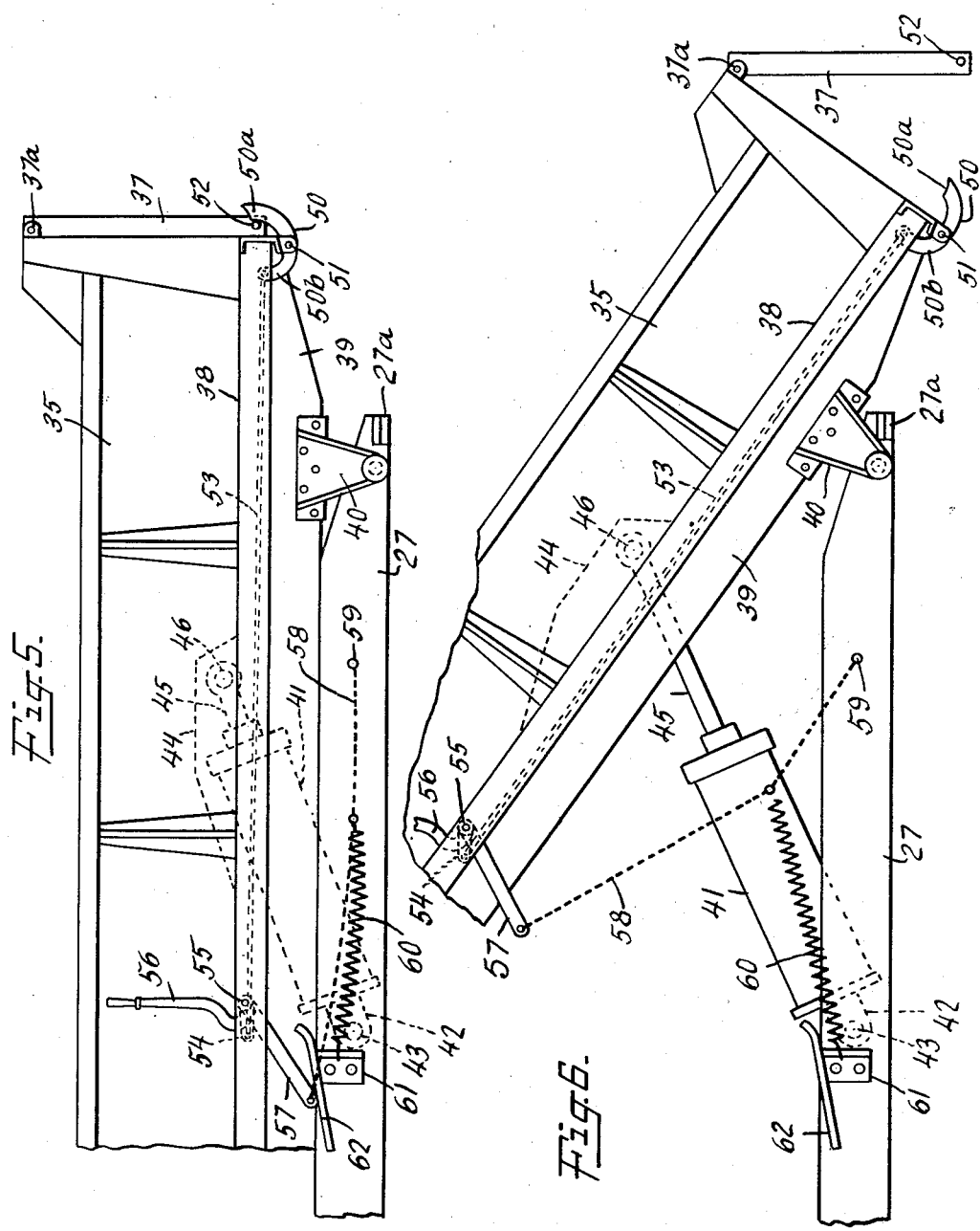

Patented Oct. 3, 1939

2,174,956

UNITED STATES PATENT OFFICE 2,174,956

DUMPING TRUCK

William Leonedost Allison, Phoenix, Ariz.

Application January 13, 1938, Serial No. 184,758

1 Claim. (Cl. 298—9)

This invention relates to dumping trucks in which the body is movable about both vertical and horizontal axes, so that the load may be dumped at either side or at the rear of the vehicle. More particularly, the invention is concerned with a truck of the type referred to in which the movable mounting for the body is of novel construction and the body is provided with a new locking and release mechanism for the tail gate, these features facilitating the use of the truck and permitting the operator to dump the load accurately and easily at any point throughout a wide angle.

In the new truck, the body is mounted for movement about a horizontal axis on a turn table structure which is supported by the truck chassis and is movable about a vertical axis. The raising and lowering of the body is effected hydraulically by means of a cylinder and piston device mounted on the turn table and connected to the under side of the body, the device being actuated by fluid supplied under pressure from a power driven pump through connections passing through the turn table king pin, which is made hollow for the purpose. The rotation of the turn table is accomplished by a power driven pinion mounted on the chassis and meshing with a curved rack on the table. Both the pump and the pinion are driven by the motor of the truck through suitable power take-off connections and they are controlled from the cab.

The body is provided with the usual tail gate pivotally mounted at its upper end on the body, and means are provided for holding the gate in locked position until the body has been raised to dumping position, whereupon the gate is automatically released to permit discharge of the load. As the body is lowered, the automatic device, which if desired may also be operated manually, relocks the gate in readiness for the next load.

With the construction described, all parts of the devices for swinging the body and raising and lowering it are beneath the body and entirely out of the way, although they are readily accessible for maintenance and repair. In addition, the devices are all power driven and controllable from the cab, so that the use of the automatic tail gate mechanism in conjunction with the devices makes it possible for the driver to discharge the load rapidly and with great facility at any desired point without leaving the cab.

For a better understanding of the invention, reference may be had to the accompanying drawings, in which:

Figure 1 is a view of the new truck in side elevation;

Figure 2 is a rear end view;

Figure 3 is a plan view of a portion of the turn table and the driving mechanism therefor;

Figure 4 is a sectional view on the line 4—4 of Figure 3; and

Figures 5 and 6 are fragmentary views in side elevation showing the operation of the release mechanism for the tail gate locking device.

The truck illustrated in Figure 1 comprises a chassis provided with wheels 10 and including a frame made up of longitudinal members 11 and suitable cross-members, the cross-members 12 near the ends of the frame projecting upwardly above the longitudinal members and having their tops downwardly beveled at the ends. A cab 13 is mounted on the chassis to the rear of the truck driving motor, and behind the cab about midway of the length of the chassis frame, a circular platform 14 is mounted on the frame and secured thereto in any suitable manner. A circular plate 15 of slightly greater diameter is supported on the platform 14 by means of a circular ball bearing consisting of upper and lower raceways 16, 17, and a row of balls 18, the ball bearing lying near the peripheries of the platform and plate. Secured to the upper face of the plate to surround a central opening therethrough is a length of tubing 19 from which radiate strengthening ribs 20, the parts being secured together in any suitable manner, as by welding. A similar tubular member 19a of somewhat greater diameter is secured to the under surface of the platform about a central opening and from the member radiate strengthening ribs 20a which are secured to the member and the platform and are cut away to receive the longitudinal members 11 of the chassis frame.

The plate and platform are held together by means of a hollow king pin 21 which extends through the tubular member 19, the plate 15, and the platform 14, and into the tubular member 19a. The king pin has a circumferential flange 22 at its upper end which bears against the end of the tube 19 and its lower end is threaded and provided with a nut 23 which bears against a washer 24. A ball bearing 25 surrounding the king pin rests upon the washer 24 and the upper raceway of the ball bearing is seated against the under surface of a flat ring 26 through which the king pin extends, the ring having a circumferential flange welded or otherwise secured to the tubular member 19a.

Mounted on the plate 15 is a frame which comprises longitudinal channel members 27 and cross-members 27a, the latter resting on cross-members 12 of the chassis frame and having their bottom surfaces upwardly beveled at the ends. The plate 15 and the frame carried thereby constitute a turn table which may be rotated about the king pin as an axis. For this purpose, a rack 28, which may be made of a plurality of gear segments, is attached to the periphery of plate 15 to overlie the rim of the platform 14, and a pinion 29 mounted on a vertical shaft 30 supported in suitable bearings on the chassis meshes with the rack. The shaft 30 is driven through a gear box 31 containing speed reduction gears, and power is supplied to shaft 30 by a shaft 32 which leads to a power take-off device 33 located within the cab and driven by the truck motor, the device being controlled by suitable control levers 34 in the cab.

A body consisting of side walls 35, a curved front end wall 36, a tail gate 37, and a bottom 38 provided with longitudinal channel members 39 is supported by the turn table, and in the normal position of the body, the members 39 rest upon the longitudinal members 27 of the turn table. The body is pivoted to the turn table for vertical rotary movement and, for this purpose, is provided with a pair of brackets 40 attached to the members 39 and pivotally connected to the members 27, the upper edges of the latter being cut away adjacent the brackets to permit the body to swing in a vertical plane.

The raising and lowering of the body is effected by a hoist cylinder 41 mounted on the turn table beneath the body by means of a bracket 42 through which extends a rod 43 secured in the channel members 27. The hoist cylinder extends rearwardly and at an incline, with its upper end lying within a hood 44 covering an opening in the bottom of the body, and it contains a piston having a rod 45 which is attached to a pin 46 connected to the body in any suitable way. The hoist device is actuated by fluid supplied by a pump 47 mounted on the chassis at any convenient point and having its inlet and outlet connected to the cylinder at opposite sides of the piston through flexible hydraulic lines 48 which extend from the pump to a point beneath the king pin and then pass upwardly through the pin to the cylinder. The pump is driven in any convenient manner from the truck motor, as by means of a shaft 49 leading to the power take-off device 33, the operation of the pump being controlled by one of the control handles 34. With this arrangement, the pump may be driven to supply fluid to the cylinder to raise or lower the truck body with a swinging movement about its pivotal connection to the turn table, and the flexible connections to the cylinder permit the hoist to function regardless of the angular position of the body and turn table in relation to the truck chassis.

The tail gate, which is pivoted at 37a near the top of the side walls of the body, is normally held closed by a pair of latch levers 50 pivotally mounted on brackets 51 attached to the sides of the body near the lower end of the gate. These levers have rearwardly projecting ends 50a, the inner curved surfaces of which are engageable with pins 52 projecting from the side edges of the gate near its lower end. The tail 50b of each lever is connected by a rod 53 to a crank 54 mounted on a transverse shaft 55 mounted in suitable bearings on the body, and the shaft is provided with a crank handle 56 at one side of the body, although two such handles may be provided, if desired. In addition to the cranks 54, the shaft is provided with a third crank 57 which is connected by a flexible connection 58, such as a chain, to a pin 59 on the turn table. A spring 60 connected to a bracket 61 on the turn table is also connected to the chain 58 between its ends. The bracket supports a plate 62 which is so inclined that in the normal position of the body, the end of the crank 57 is engaged by the plate and held in position in which the cranks 54 lie substantially in alignment with the rods 53 and cause the rods to draw on the levers 50 so that the ends 50a of the latter engage the pins 52 on the tail gate and hold the gate in closed position.

When the body is raised, the cranks 54 lie in the positions referred to until the body reaches dumping position, at which time the pull of the spring 60 will have swung the crank 57 to cause rotation of the shaft 55. This movement of the shaft is sufficient to move the cranks 54 from their initial position and cause them to act through the rods 53 to swing the levers 50 free of the pins 52. The gate may then swing clear of the body and permit the load to be dumped. When the body is moved down to the turn table again, the end of the crank 57 engages and moves down the sloping plate 62 so that, as the gate swings toward the open end of the body, the levers 50 will finally engage the gate pins and draw the gate into closed position where it will be held by the levers. The mechanism thus operating automatically, may be actuated manually, if desired, by means of the handle 56.

In the use of the new truck, the body rests on the turn table frame in alignment with the latter, while the load is being transported to its destination. At that point, the turn table is rotated by the pinion and rack, if dumping at an angle is desired, and the body is then raised by the hoist mechanism to dumping position, the tail gate opening automatically as this position is reached. When the dumping is completed and the body lowered to its initial position, the tail gate is locked automatically and thereafter the turn table is rotated to bring the turn table frame back into alignment with the chassis frame, the beveled surfaces on the cross-bars 12 and 27a facilitating this movement. The body is then held in alignment with the turn table frame by suitable guides 63, and a manually operated catch of suitable construction may be provided to hold the turn table in position relative to the chassis frame during transportation of the load or return of the truck.

The possibility of moving the turn table through a wide angle permits the load to be dumped at any convenient point at the sides or rear of the truck, and dumping is not limited to discharge in alignment with the longitudinal axis of the truck or at right angles thereto. Since the devices by which the turn table and body are rotated and the body raised and lowered are motor driven and controllable from the cab, and automatic mechanism for opening and locking the tail gate is provided, the new truck provides an efficient means for the transportation of material in that the time of delivery and dumping is cut down, and the driver can operate the several devices without leaving his seat.

In the construction disclosed, the hoist mechanism employed includes a single hoist cylinder and this type of mechanism has capacity sufficient to handle average loads. If greater hoisting capacity is required, a pair of such cylinders may be used, mounted side by side on the turn table in a manner similar to that in which the single cylinder is mounted and actuated by the same power driven means.

I claim:

In a motor driven dumping truck having a chassis, a turn table mounted thereon for horizontal rotary movement, the turn table mounting including a hollow king pin, and a body mounted on the turn table for vertical rotary movement, the combination of a hoist cylinder mounted on the turn table beneath the body, a piston in the cylinder connected to the body, a pump on the chassis, connections from the pump to the cylinder passing through the king pin, a pinion and rack mounted, respectively, on the chassis and turn table for turning the latter, and means for driving the pump and pinion from the truck motor.

WILLIAM LEONEDOST ALLISON.